US012748554B2

(12) United States Patent
Livingston et al.

(10) Patent No.: US 12,748,554 B2
(45) Date of Patent: Sep. 29, 2026

(54) DATA TRANSFER WITH RESUME COMMAND

(71) Applicant: Itron, Inc., Liberty Lake, WA (US)

(72) Inventors: Karen Livingston, Spokane, WA (US); James Lee Kann, Mica, WA (US)

(73) Assignee: Itron, Inc., Liberty Lake, WA (US)

( * ) Notice: Subject to any disclaimer, the term of this patent is extended or adjusted under 35 U.S.C. 154(b) by 178 days.

(21) Appl. No.: 18/734,489

(22) Filed: Jun. 5, 2024

(65) Prior Publication Data

US 2025/0377828 A1 Dec. 11, 2025

(51) Int. Cl.
*G06F 3/06* (2006.01)

(52) U.S. Cl.
CPC .......... *G06F 3/0659* (2013.01); *G06F 3/0604* (2013.01); *G06F 3/0683* (2013.01)

(58) Field of Classification Search
CPC .... G06F 3/0659; G06F 3/0604; G06F 3/0683; H04L 67/06; H04L 67/12
See application file for complete search history.

(56) References Cited

U.S. PATENT DOCUMENTS

| | | | | |
|---|---|---|---|---|
| 2012/0233702 | A1* | 9/2012 | Matsuda | G06F 21/608 726/26 |
| 2013/0018845 | A1* | 1/2013 | Macaskill | H04L 67/306 707/634 |
| 2015/0149991 | A1* | 5/2015 | Chen | G06F 11/1402 717/172 |
| 2016/0085920 | A1* | 3/2016 | Cyran | G06F 16/90335 705/3 |
| 2021/0014111 | A1* | 1/2021 | Teboulle | H04L 67/34 |
| 2021/0286797 | A1* | 9/2021 | Gedliczka | G06F 16/2282 |

FOREIGN PATENT DOCUMENTS

| | | | | |
|---|---|---|---|---|
| FR | 3045181 | A1 * | 6/2017 | G06F 9/44536 |
| WO | WO-2024042710 | A1 * | 2/2024 | H04Q 9/00 |

OTHER PUBLICATIONS

Lightweight Machine to Machine Technical Specification; 2018 Open Mobile Alliance; 142 pages.
Simming, John; "Remote Meter Firmware Update" 2011 American Electric Power Company; 9 pages.

(Continued)

*Primary Examiner* — Kostas J Katsikis
(74) *Attorney, Agent, or Firm* — Lee & Hayes, P.C.

(57) ABSTRACT

Techniques for data transfer are described herein. In an example, a command to transfer a first data file is received at a computing device. The computing device determines if at least two processes exist, or do not exist, from among processes including: a first transfer process of the first data file; a second transfer process of a second data file; and a third process, not related to the first data-transfer or the second data-transfer. An action is selected from among a plurality of actions, wherein the selecting is based at least in part on which processes were found to exist. The plurality of actions may include: resuming the first transfer process; canceling the second transfer process and starting a new process to transfer the first data file; rejecting the command; allowing the third process to conclude and then starting the new process to transfer the first data file; and starting the new process to transfer the first data file.

20 Claims, 6 Drawing Sheets

(56) References Cited

OTHER PUBLICATIONS

Simple meter reading example; retrived on Jun. 5, 2024 at https://www.gurux.fi/Gurux.DLMS.Client; 18 pages.
TFTP: Trivial File Transfer Protocol; retrieved on Jun. 5, 2024 from https://itexus.com/glossary/tftp-trivial-file-transfer-protocol/#gref; 4 pages.
Examination Report for Australian Application No. 2025202344, Dated Feb. 20, 2026, 3 pages.

* cited by examiner

DATA TRANSFER WITH RESUME COMMAND

BACKGROUND

In a utility environment, the Companion Specification for Energy Metering (COSEM) and Device Language Message Specification (DLMS) provide standards and definitions for image-transfer objects (i.e., data-transfer objects and/or functionality). However, no "resume" functionality is provided for data-file transfer resumption if the data-file transfer process stalls or fails.

Various work-arounds are available, such as re-starting the entire data-file transfer process, or attempting to re-send missing data-blocks, etc. However, a more seamless method of data-file transfer would be welcome in the DLMS/COSEM utility environment. Such a method would be particularly beneficial to reduce network bandwidth consumption, conserve battery-powered device life, increase an overall success rate of data-file transfers, and decrease time spent in data-file transfer while increasing time spent using the new data-file, etc. Moreover, in very high-latency networks, back-and-forth communications between a central server and remote computing devices can make controlling data-file transfer operations very difficult.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The disclosure describes techniques for transferring data (e.g., the transfer of an "image" or a data file) and for the enablement and utilization of a data-transmission resumption method (e.g., an advanced resume command). Thus an "image" may be thought of as a large data file.

Example System and Techniques

Figure 1:
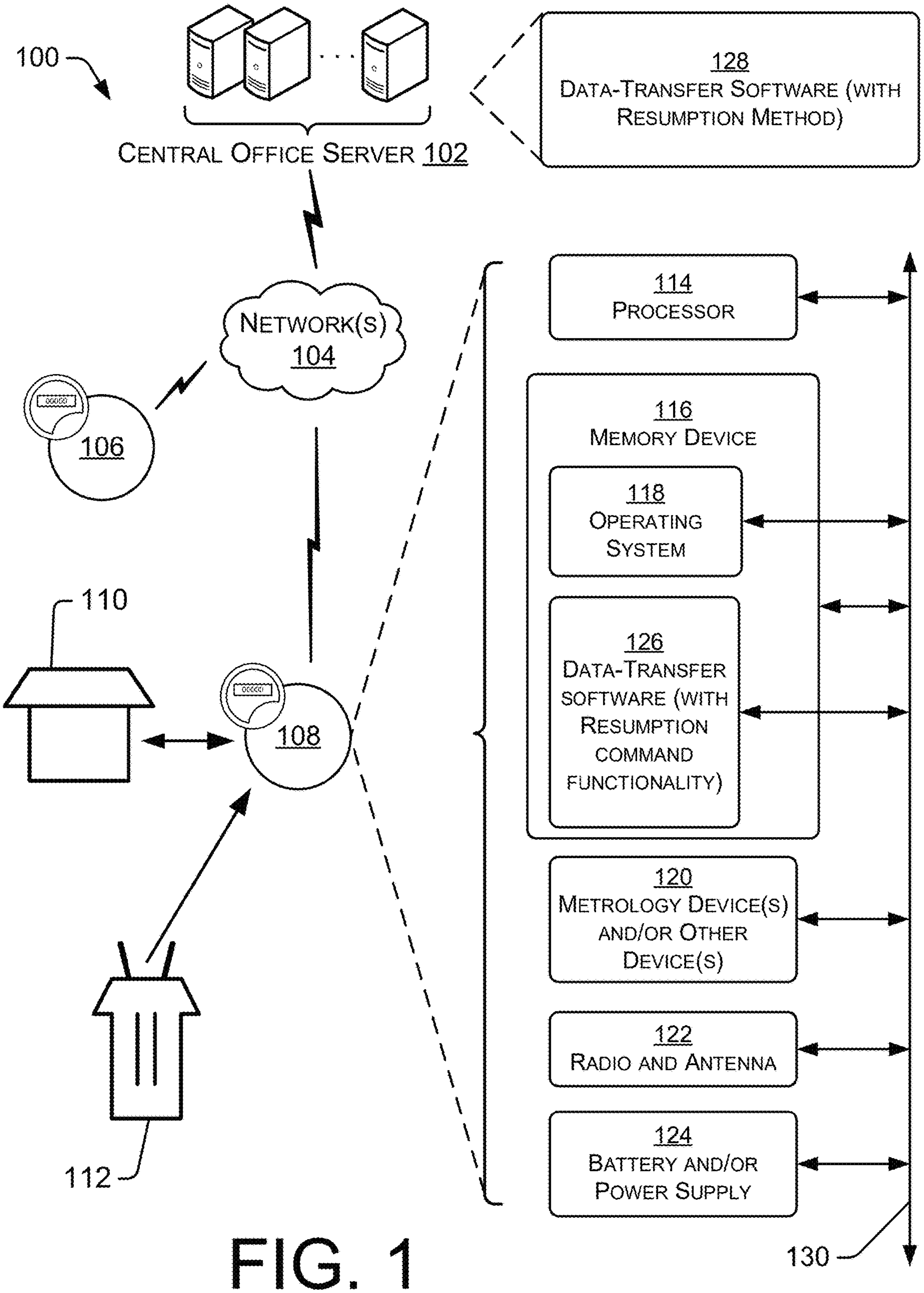
FIG. 1 is a block diagram showing an example environment within which data-file transfer with a resume method is performed.

FIG. 1 shows aspects of an example electricity grid 100, including techniques for transferring data and for the enablement and utilization of a data-transmission resumption method(s) (e.g., a resume command). Elements of the techniques may be implemented at the smart utility meter (or other computing device) level, at the electricity company server level, and/or at the "cloud" level. While the techniques described herein are shown using a utility-metering environment as an example context, the techniques may also be used for computing devices in an internet-of-things environment. The example electricity grid 100 includes central office, back office, and/or cloud server(s) 102, one or more networks 104, and a plurality of computing devices, such as smart meter 106. The central office server(s) 102 may be connected to the one or more networks 104 such as the internet and/or a private network (e.g., a utility company network). One or more of the one or more networks 104 may be configured according to Companion Specification for Energy Metering (COSEM) and Device Language Message Specification (DLMS) standards.

A smart utility meter 108 serves a customer site 110, and is representative of many such meters and sites, which may number in the thousands or hundreds of thousands. In the example shown, the meter is a smart electricity meter and is in communication with the central office server(s) 102 through the one or more networks 104. A transformer 112 is configured to serve one or more customers, and provides low voltage service to the smart utility meter 108. The transformer 112 is representative of many such transformers, which may number in the thousands or hundreds of thousands.

The smart utility meter 108 may include metrology device(s) 120, which may measure consumption of a commodity, such as electricity, natural gas, or water. The smart utility meter 108 may include a radio and antenna 122. Alternatively, the smart meter may include a PLC modem, cellular modem, Wi-Fi radio, and/or other communications device(s). The smart utility meter 108 may also include a battery and/or a power supply 124. In the example of a system configured as an electricity grid, a battery is not required. A power supply is configured to provide voltage-regulated direct current (DC) power at one or more prescribed voltage levels for operation of the processor 114, the memory device 116, the radio and antenna 122, and/or other devices. A bus, printed circuit board, wiring harness, and/or other circuit connectivity device(s) 130 may be used to connect one or more of the processor 114, the memory device 116, the metrology device(s) 120, the radio and antenna 122, and the power supply 124.

In the example shown, the memory device 116 may include software programs, such as an operating system 118, that when executed by the processor 114, perform useful functions. Additionally, a system for transferring data and for the enablement and utilization of a data-transmission resumption method(s) may include data-transfer software 126 (with resumption and/or resume command functionality) located on the memory device 116 of the smart utility meter 108, which may synergistically interact with data-transfer software 128 located on the central office server(s) 102.

In example operation, portions of the system operational on the central office server(s) 102 may send a command (e.g., a "resume" command) to the data-transfer software 126 operational on smart utility meter 108, which may receive and process the resume command. As a result of the processing, the processor 114 of the smart utility meter 108 may: resume an existing data transfer; cancel an existing data transfer and initiate a new data transfer; non-temporarily reject the resume command; temporarily reject the resume command and associated data transfer; initiate the data transfer while leaving an unrelated data transfer unaffected; and/or perform other functionality. The data-transfer software 126 of the smart utility meter 108 may respond to the data-transfer software 128 of the central office server(s) 102 with a success message, a failure message, or a message indicating a delay and/or a temporary failure. And further, the data-transfer software 128 of the central office server(s) 102 may respond by transferring data to the data-transfer software 126 of the smart utility meter 108.

Example Methods

In some examples, the techniques discussed herein may be implemented by one more processors accessing software defined on one or more memory devices. The processor(s) and memory device(s) may be located on an electricity meter and/or a cloud-based server (e.g., a server of a utility company). If the functionality is distributed, software may reside on both the electricity meter and the server.

In other examples of the techniques discussed herein, the methods of operation may be performed by one or more application specific integrated circuits (ASIC) or may be performed by a general-purpose processor utilizing software defined in computer readable media. In the examples and techniques discussed herein, the memory 116 may comprise computer-readable media and may take the form of volatile memory, such as random-access memory (RAM) and/or non-volatile memory, such as read only memory (ROM) or flash RAM. Computer-readable media devices include volatile and non-volatile, removable, and non-removable media implemented in any method or technology for storage of information such as computer-readable instructions, data structures, program modules, or other data for execution by one or more processors of a computing device. Examples of computer-readable media include, but are not limited to, phase-change memory (PRAM), static random-access memory (SRAM), dynamic random-access memory (DRAM), other types of random access memory (RAM), read-only memory (ROM), electrically erasable programmable read-only memory (EEPROM), programmable read-only memory (PROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media includes non-transitory media. Computer-readable media does not include transitory media, such as modulated data signals and carrier waves, and/or other information-containing signals. Accordingly, the functionality to resume an existing data transfer; cancel an existing data transfer and initiate a new data transfer; non-temporarily reject the resume command; temporarily reject the resume command and associated data transfer; initiate the data transfer while leaving an unrelated data transfer unaffected; and/or perform other functionality (e.g., such as that described in FIGS. 2 through 7); may be defined on one or more non-transitory computer-readable media.

Figure 2:
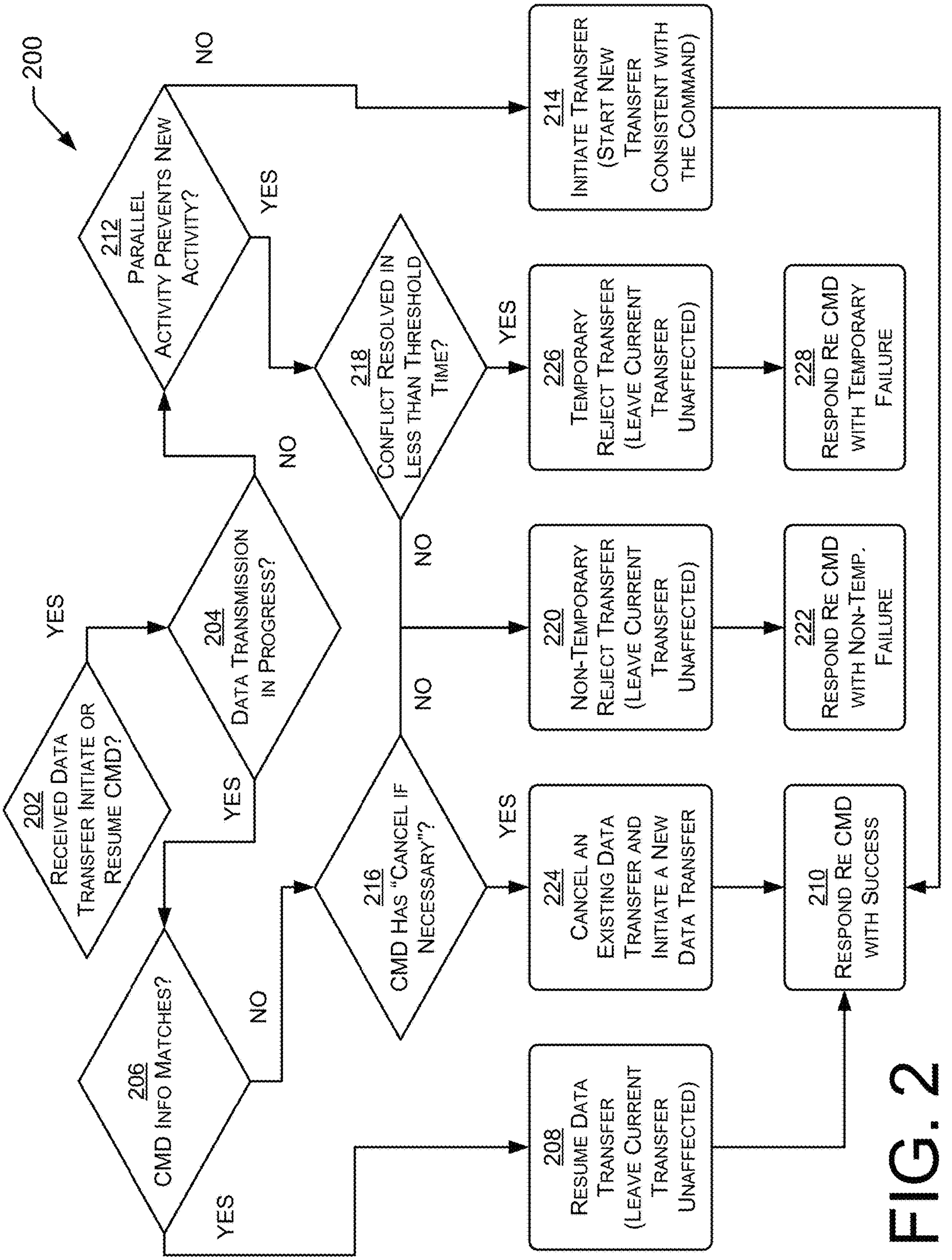
FIG. 2 is a flowchart showing a first example operation of a computing device configured to perform data-file transfer with a resume method.

FIG. 2 shows an example method 200 of operation of a computing device (such as the smart utility meter 108 of FIG. 1) configured to perform data-file transfer with a resumption (and/or resume command) method and functionality. Six example logical paths will be discussed, which select between five resultant activities. In an example, the five activities may include: (1) resuming an existing data transfer; (2) cancelling an existing data transfer and initiate a new data transfer; (3) non-temporarily rejecting the resume command and associated data transfer; (4) temporarily rejecting the resume command and associated data transfer; and (5) initiating the data transfer while leaving an unrelated data transfer unaffected. Each of the five activities is associated with one of three responses to the resume command sender.

In an example of a first logical path and resultant activity, a command from the server is received at the metering device and is determined to be related to an existing data transfer process (i.e., the command may be a repeat of an earlier command). In response, the existing data transfer is left unaffected, and a response is sent—by the metering device to the server—indicating success. The first logical path involves blocks 202, 204, 206, 208, and 210 of FIG. 2. At block 202, a data-file resume or initiate command is received. In the example of FIG. 1, the command may have been sent by the central office server(s) 102 and received by the smart utility meter 108. At block 204, it is determined that a data transmission is in progress. In the example of a transmission in progress seen in FIG. 1, the central office server(s) 102 of the central office may be sending data to the smart utility meter 108 (or other computing device, such as a device of the internet of things). The transmission that is identified may be performed by the interaction of the data-transfer software 126 operating on the smart utility meter 108 with data-transfer software 128 operating on the central office server(s) 102. At block 206, information associated with the command received at block 202 and the information associated with the transmission identified at block 204 are compared. The comparison will reveal if the command received at block 202 is for the same data as the transmission identified at block 204. The information used in the comparison may include data elements such as: a data-file identifier; a data-file size; a data-file block size; a data-file transfer type; a verification hash of the data-file; an automatic verification check; an enable/cancel datum; and/or other meta data regarding the data-file as being transferred. In this example, the comparison reveals that the command received at block 202 is for the same data as the transmission identified at block 204. Accordingly, at block 208 the data transfer identified at block 204 is resumed and/or left unaffected if actively operational. At block 210, the metering device sends a response to the server indicating that actions related to the command were successful.

In an example of a second logical path and resultant activity, a command from the server is received at the metering device and is determined to be unrelated to an existing data transfer process. In response, the command is examined for a "cancel if necessary" notation. Responsive to the authority given by such notification, an existing data transfer is cancelled, and a new data transfer process is launched based on the command. A response is sent—by the metering device to the server-indicating success. The second logical path involves blocks 202, 204, 206, 216, 224, and 210. At block 202, a data-file transfer resume or data-file transfer initiate command is received. In the example of FIG. 1, the command may have been sent by the central office server(s) 102 and received by the smart utility meter 108. At block 204, it is determined that a data-file transmission is in progress. In the example of a transmission in progress seen in FIG. 1, the central office server(s) 102 of the central office may be sending data to the smart utility meter 108. At block 206, information associated with the command received at block 202 and the information associated with the transmission identified at block 204 are compared. The comparison will reveal if the command received at block 202 is for the same data as the transmission identified at block 204. As discussed above, the information used in the comparison may include factors such as a data-file identifier, a data-file size, etc. In this example, the comparison reveals that the command received at block 202 is associated with data that is different from the transmission identified at block 204. Accordingly, at block 216 the command is examined to see if it includes a "cancel if necessary" notation. In this case, such notation is found and at block 224 the existing data transfer process is cancelled and a new process—consistent with the command received at block 202—is initiated. At block 210, the metering device sends a response to the server indicating that actions related to the command were successful.

In an example of a third logical path and resultant activity, a command from the server is received at the metering device and is determined to be unrelated to an existing data transfer process. In response, the command is examined for a "cancel if necessary" notation. Without finding such notation, a non-temporary rejection of the transfer of data indicated by the command indicated, which leaves the current data transfer process in operation. A response is sent—by the metering device to the server—indicating a non-temporary failure of the command. The third logical path involves blocks 202, 204, 206, 216, 220, and 222. At block 202, a data-file transfer resume or data-file transfer initiate command is received. In the example of FIG. 1, the command may have been sent by the central office server(s) 102 and received by the smart utility meter 108. At block 204, it is determined that a data-file transmission is in progress. In the example of a transmission in progress seen in FIG. 1, the central office server(s) 102 of the central office may be sending data to the smart utility meter 108. At block 206, information associated with the command received at block 202 and the information associated with the transmission identified at block 204 are compared. The comparison will reveal if the command received at block 202 is for the same data as the transmission identified at block 204. As discussed above, the information used in the comparison may include factors such as a data-file identifier, a data-file size, etc. In this example, the comparison reveals that the command received at block 202 is associated with data that is different from the transmission identified at block 204. Accordingly, at block 216 the command is examined to see if it includes a "cancel if necessary" notation. In this case, such notation is not found. Accordingly, at block 220 the existing data transfer process is left unaffected. And further, the new process—consistent with the command received at block 202—is rejected in a non-temporary and/or permanent manner. At block 222, the metering device sends a response to the server indicating that the command failed.

In an example of a fourth logical path and resultant activity, a command from the server is received at the metering device. No data-file transfer process is active. However, a parallel activity (or activity that would be parallel to the activity of the command) is found to be in progress. Moreover, it is determined that the parallel activity will not resolve in a threshold period of time. Accordingly, a non-temporary rejection of the transfer of data indicated, which leaves the current data transfer process in operation. A response is sent—by the metering device to the server—indicating a non-temporary failure of the command. The fourth logical path involves blocks 202, 204, 212, 218, 220, and 222. At block 202, a data-file resume transfer or data-file transfer initiate command is received. In the example of FIG. 1, the command may have been sent by the central office server(s) 102 and received by the smart utility meter 108. At block 204, it is determined that a data-file transmission is not in progress. However, at block 212 it is determined that some other, i.e., a process that would be "parallel" in time to the process of the command, is in progress. At block 218, the conflict between the process of the command (if initiated) received at block 202 and the "parallel" in time process found at block 212 is examined. In this example, the examination determines that the conflict would not be resolved in less than a threshold period of time. Accordingly, at block 220, the process indicated for execution by the command, which was received at block 202, is non-temporarily (i.e., permanently) rejected to allow completion of the process discovered at block 212. At block 222, the metering device sends a response to the server indicating that the command failed.

In an example of a fifth logical path and resultant activity, a command from the server is received at the metering device. No data-file transfer process is active. However, a parallel activity (or activity that would be parallel to the activity of the command) is found to be in progress. However, it is determined that the parallel activity will be resolved in less than a threshold period of time. Accordingly, a temporary rejection of the transfer of data indicated, which leaves the current data transfer process in operation. Following conclusion of the parallel process, the data transfer process indicated by the command is executed. A response is sent—by the metering device to the server—indicating a temporary failure of the command. The fifth logical path involves blocks 202, 204, 212, 218, 226, and 228. At block 202, a data-file transfer resume or a data-file transfer initiate command is received. In the example of FIG. 1, the command may have been sent by the central office server(s) 102 and received by the smart utility meter 108. At block 204, it is determined that a data-file transmission is not in progress. However, at block 212 it is determined that some other, i.e., a process that would be "parallel" in time to the process of the command, is in progress. At block 218, the conflict between the process of the command (if initiated) received at block 202 and the "parallel" in time process found at block 212 is examined. In this example, the examination determines that the conflict would be resolved in less than a threshold period of time. Accordingly, at block 226, the process indicated for execution by the command, which was received at block 202, is temporarily rejected to allow completion of the process discovered at block 212. At block 228, the metering device sends a response to the server indicating a temporary failure of the command.

In an example of a sixth logical path and resultant activity, a command from the server is received at the metering device is received. No data-file transfer process is active and no parallel activity (or activity that would be parallel to the activity of the command) is found to be in progress. With no active transfer process, and no parallel activity, the data transfer process indicated by the command is executed. A response is sent—by the metering device to the server—indicating success. The sixth logical path involves blocks 202, 204, 212, 214, and 210. At block 202, a data-file transfer resume or a data-file transfer initiate command is received. In the example of FIG. 1, the command may have been sent by the central office server(s) 102 and received by the smart utility meter 108. At block 204, it is determined that a data-file transmission is not in progress. At block 212, it is determined that no other process or activity is in progress. At block 214, the process of the command received at block 202 is initiated, including a data-file transfer. At block 210, the metering device sends a response to the server indicating that actions related to the command were successful.

Figure 3:
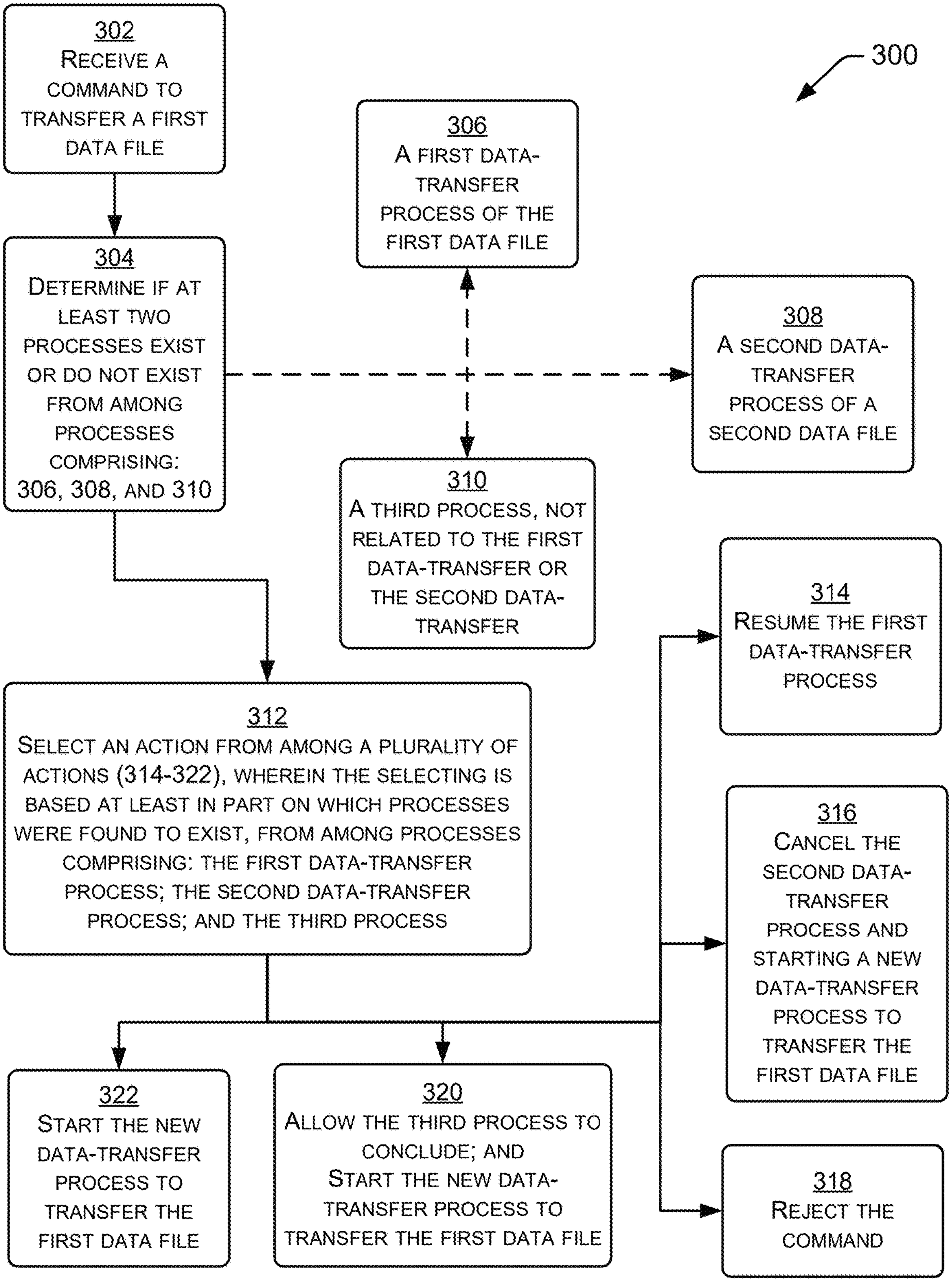
FIG. 3 is a flowchart showing a second example operation of a computing device configured to perform data-file transfer with a resume method.

FIG. 3 shows a second example of a method 300 of operation of a computing device configured to perform data-file transfer having a resume command and/or functionality. The method 300 may be configured as computer-executable instructions defined on a non-transitory computer-readable media for execution by a computing device, such as the smart utility meter 108. In one example, the instructions configure the computing device to operate within a Device Language Message Specification (DLMS)/Companion Specification for Energy Metering (COSEM) environment.

At block 302, a command to transfer a first data file is received. In the example of FIG. 1, the command may be received by data-transfer software 126 at the smart utility meter 108. The command may have been sent by the data-transfer software 128 of the central office server(s) 102.

At block 304, processes operating on the computing device are determined. That is, software programs, applications, and/or "processes" are looked for, identified, and/or determined. By identifying operating processes, the load on the computer and/or processor of the computing device (e.g., the smart utility meter 108) may be assessed and that knowledge utilized when deciding how to respond to the command of block 302. In an example, it is determined if at least two processes exist or do not exist from among processes of several types and/or from among several categories. In the example, the blocks 306, 308, and 310 identify three such processes or types of processes that may be present and/or operational. At block 306, a first data-transfer process of the first data file is looked for and/or a determination is made if it exists. Thus, at block 306 it is determined if a process is already working on the data-transfer process indicated by the command received at block 302. At block 308, a second data-transfer process of a second data file is looked for and/or a determination is made if it exists. Thus, at block 308 it is determined if a process is working on a data-transfer process that is different from the data and data-transfer process invoked by the command received at block 302. At block 310, it is determined if a third process, not related to the first data-transfer or the second data-transfer is operational. Such a process can be a data-transfer process, a software install process, a utility consumption-related process, etc.

Figure 4:
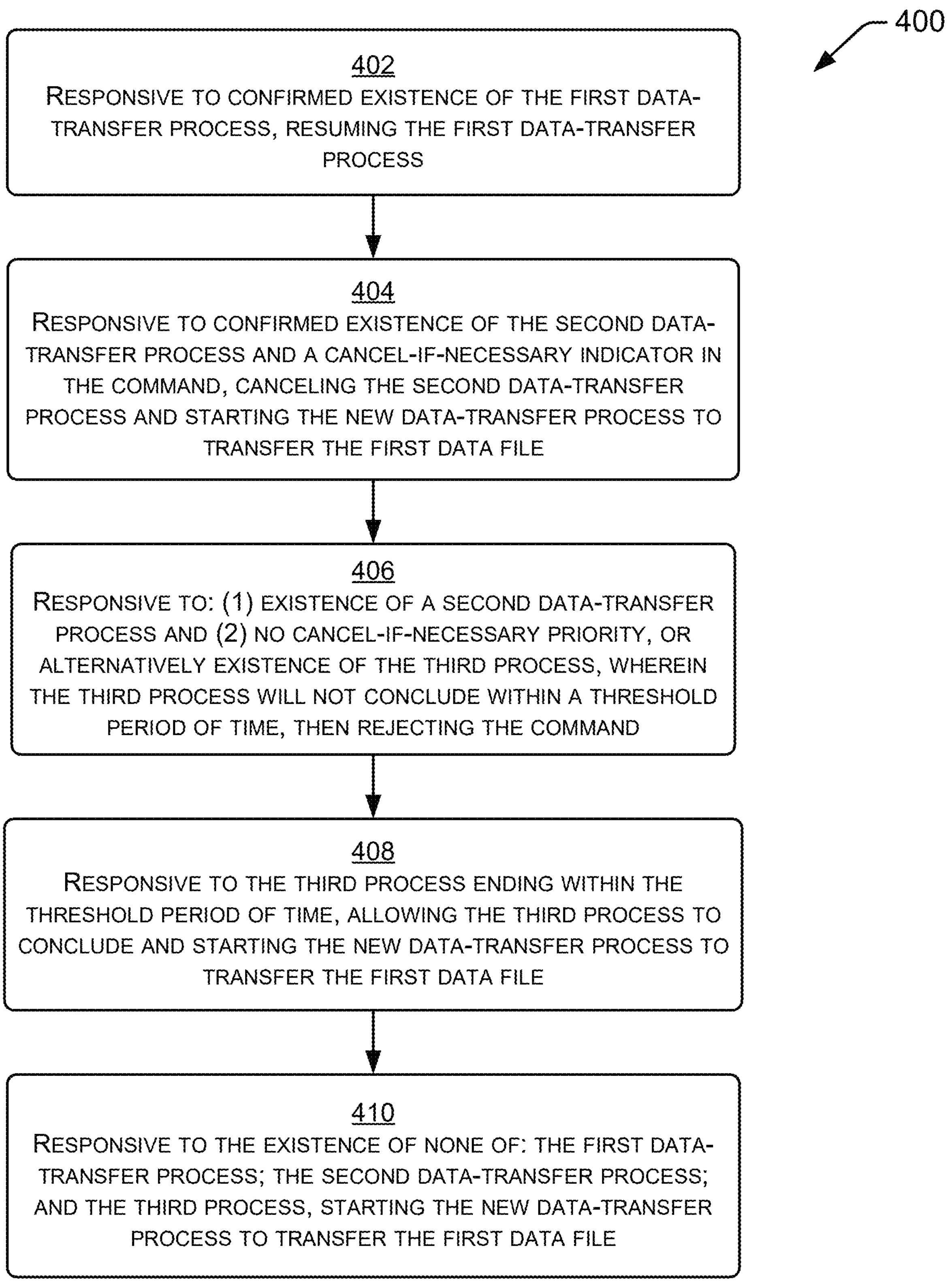
FIG. 4 is a flowchart showing example detail by which the selection process of block 312 of FIG. 3 may be performed.

At block 312, an action is selected from among a plurality of actions (shown in blocks 314-322). The selection is based at least in part on which processes were found to exist, from among processes comprising: the first data-transfer process; the second data-transfer process; and the third process. The selection may determine how the incoming command (received at block 302) is processed. Thus, the actions shown at blocks 314-322 are related to different techniques to handle and process the command received at block 302. Depending on the selection of an action, the command may be performed, delayed, rejected, etc. FIG. 4 shows how the characteristics (determined at blocks 304-310) are mapped into the actions 314-322, by the block 312. The actions of blocks 314-322 are described below.

At block 314, under a set of conditions (e.g., the conditions of block 402 of FIG. 4) the first data-transfer process is resumed. That is, if the first data-transfer process and/or any process transferring the first data was operational, partially complete, suspended, etc., it may be resumed.

At block 316, under a set of conditions (e.g., the conditions of block 404 of FIG. 4) the second data-transfer process is cancelled, and a new data-transfer process is started to transfer the first data file. That is, if a second data-transfer process of second data was operational, it may be cancelled to provide processing power, network bandwidth, priority, etc., to the transfer of the first data file (e.g., as indicated by the command of block 302).

At block 318, under a set of conditions (e.g., the conditions of block 406 of FIG. 4) the command of block 302 can be rejected. Referring to blocks 216-220 of FIG. 2, if the command does not have the power to cancel other processes ("no" on block 216) and an operating process will not complete in less than the threshold period of time ("no" on block 218), then the command of block 202 is rejected at block 220, and a notification is sent at block 222.

At block 320, under a set of conditions (e.g., the conditions of block 408 of FIG. 4) the third process is allowed to conclude. Upon conclusion of that process, a new data-transfer process is started to transfer the first data file (as indicated by the command of block 302).

At block 322, under a set of conditions (e.g., the conditions of block 410 of FIG. 4) a new data-transfer process is started to transfer the first data file. (Note that commencement of this new process is different than resuming an existing process, as seen at block 314.)

FIG. 4 shows an example 400 describing detail by which the selection process of block 312 of FIG. 3 may be performed. The five blocks of FIG. 4 are similar to a case statement in computer science, in which one of the blocks will match a set of conditions, and that block will be executed. Referring first to FIG. 2, the decision blocks 204, 206, 212, 216, and 218 show a similar decision process resulting in selection of an appropriate action block 208, 224, 220, 226, or 214. Thus, the five blocks of FIG. 4 summarize six paths through the decision blocks 204, 206, 212, 216, and 218, and associate the six paths with five respective action blocks 208, 224, 220, 226, and 214. (Note that block 220 can be reached by two different paths.)

At block 402, responsive to confirmed existence of the first data-transfer process, the first data-transfer process is resumed. In the example of FIG. 2, block 208 is reached based on an active data transmission and command information that matches the received command at 202.

At block 404, responsive to: (1) confirmed existence of the second data-transfer process (i.e., not matching the characteristics of the first data transfer of the command); and (2) a cancel-if-necessary indicator in the command, then canceling the second data-transfer process and starting the new data-transfer process to transfer the first data file. In the example of FIG. 2, block 224 is reached based on an active data transmission and command information that does not match the received command at 202 (i.e., the data being transmitted is different data than indicated by the command). Block 224 is also reached based on the "cancel if necessary" characteristic to the command, indicating that the command has priority over other commands (i.e., it can cancel those other commands and their associated processes).

At block 406, the command is rejected, responsive to: (1) the existence of a second data-transfer process (i.e., a data-transfer process of data not indicated by the command of block 202 or 302); and (2) the command not having a cancel-if-necessary priority to cancel such a concurrent process. The command is also rejected responsive to: a third process that will not conclude within a threshold period of time. Accordingly, the command is rejected under either set of circumstances. In the example of FIG. 2, the block 220 indicates a rejection of the command of block 202, and can be arrived at through the sequence of blocks 204, 212, 218 or alternatively, blocks 204, 206, 216.

At block 408, responsive to the third process being projected and/or predicted to end within the threshold period of time, or actually ending within the threshold period of time, the third process is allowed to conclude. Subsequently, a new data-transfer process is started to transfer the first data file. In the example of FIG. 2, the block 226 allows the current process to have the threshold period of time to conclude, after which the command may be performed.

At block 410, responsive to the existence of none of: the first data-transfer process; the second data-transfer process; and the third process, the new data-transfer process may be started to transfer the first data file. In the example of block 214 of FIG. 2, in view of the lack of competing processes, the new process is started to transfer the first data indicated by the command of block 202.

Figure 5:
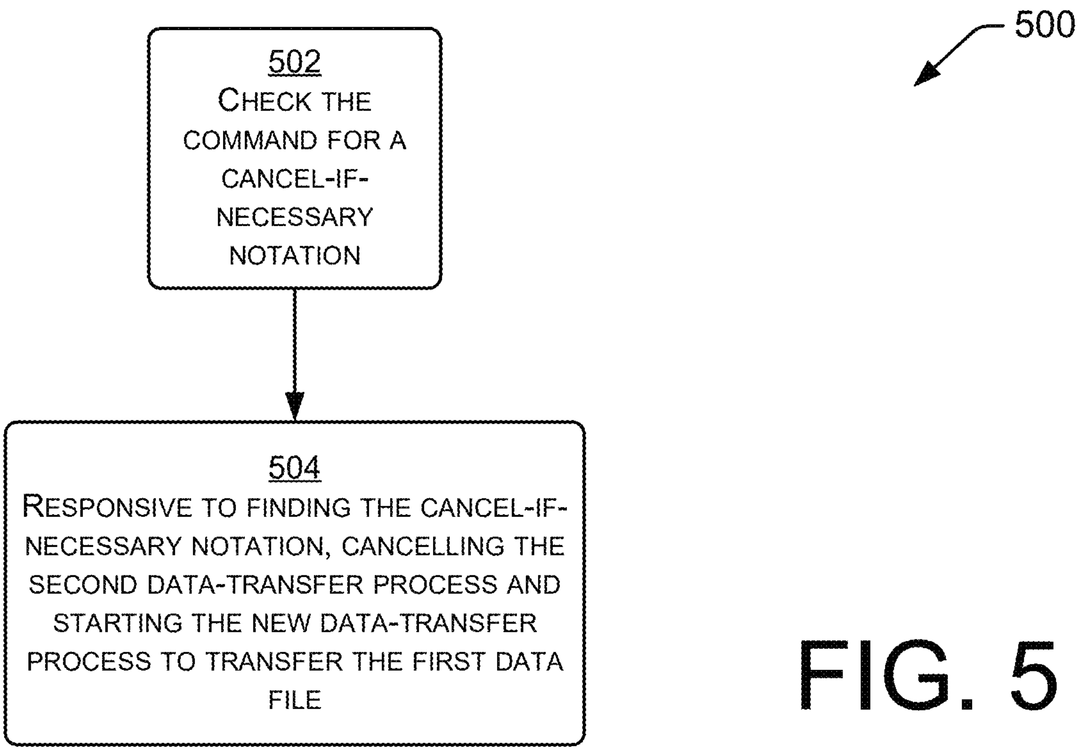
FIG. 5 is a flowchart showing example characteristics, use and/or operation of a cancel-if-necessary indicator or notation in a command.

FIG. 5 shows an example method 500, wherein a cancel-if-necessary indicator or notation in a command is utilized. In the example of FIG. 2, block 216 determines the command (received at block 202) has the cancel-if-necessary notation. Such notation gives the command the priority to cancel other processes (computer programs and/or subroutines) that may be operational. At block 502, the command is checked for a cancel-if-necessary notation. In an example, the notation may be part of the command sent by the data-transfer software 128 of the central office server(s) 102. Accordingly, the data-transfer software 128 may prioritize operations on the smart utility meter 108. At block 504, responsive to finding the cancel-if-necessary notation, a data-transfer process may be cancelled. In an example, by cancelling one data-transfer process (or other process performing other tasks) resources are made available to start a new data-transfer process, such as the process and/or data indicated by the command (e.g., the command of block 202 of FIG. 2).

Figure 6:
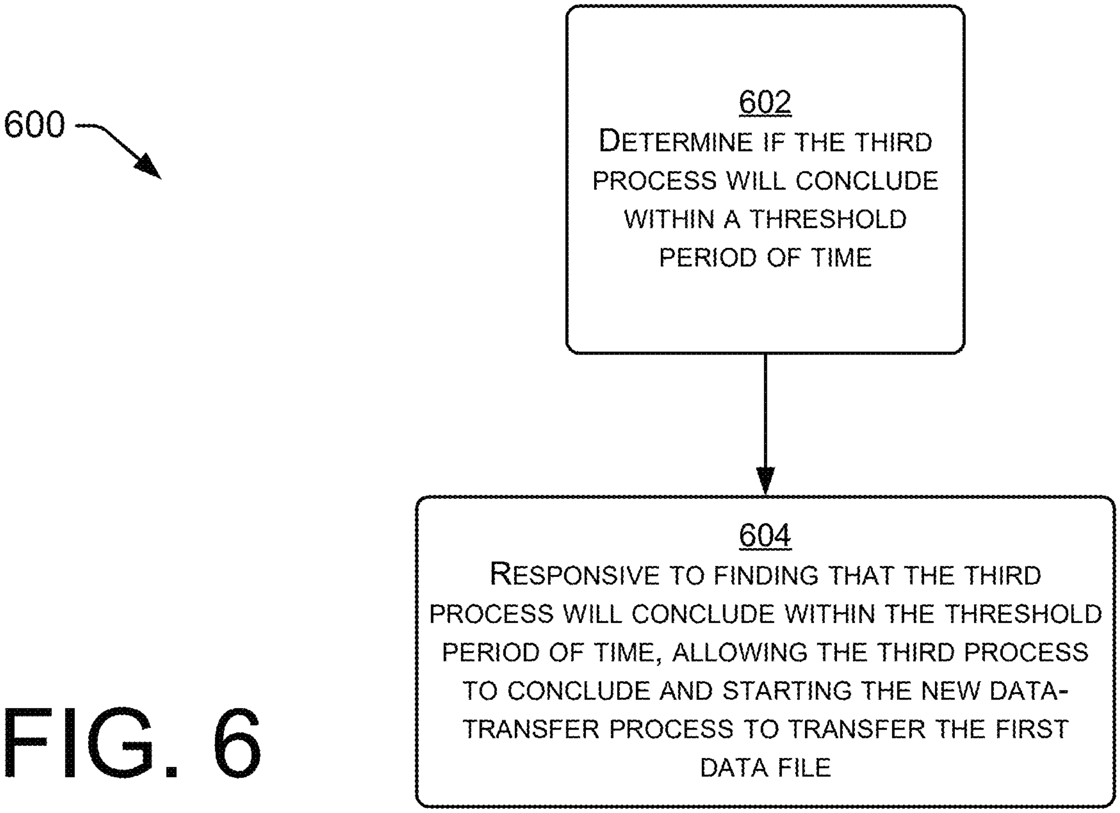
FIG. 6 is a flowchart showing example characteristics, use and/or operation of a threshold period of time as a tool to determine if a process will conclude in a timely manner to allow a further process to be initiated.

FIG. 6 shows an example method 600, wherein a threshold period of time is utilized as a tool or technique to determine if a process will conclude in a sufficiently timely manner to allow a further process to be initiated. At block 602, it is determined if the third process will conclude (or has concluded) within a threshold period of time. In the example of FIG. 1, this determination is made by the data-transfer software 126 of the smart utility meter 108. At block 604, responsive to finding that a process will conclude (or has concluded) within the threshold period of time, allowing the process to conclude and starting the new data-transfer process to transfer a data file. In the example of FIG. 2, at block 218 the conflict (between the third or parallel process of block 212 and the process requested by the command of block 202) is resolved in less than the threshold period. Accordingly, at block 226 the command is temporarily rejected, but may be initiated after the threshold period of time (of block 218) has elapsed. Accordingly, the threshold allows an existing process, such as the parallel activity (i.e., process) of block 212, to conclude. Advantageously, the progress made by the "parallel" process is not lost, at the cost of a minor delay to the process of the command of block 202.

Figure 7:
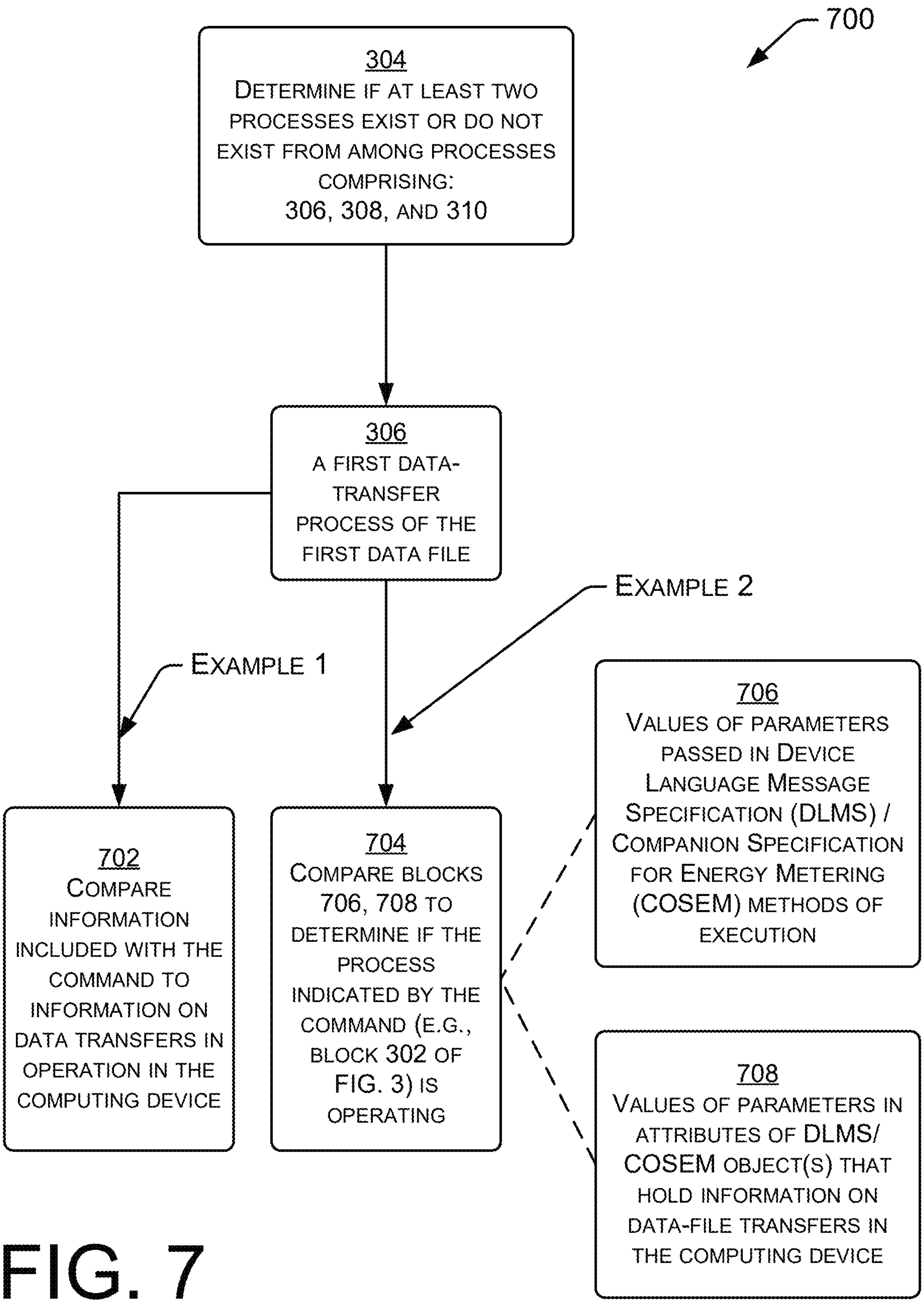
FIG. 7 is a flowchart showing two alternative example techniques by which a data-transfer process may be confirmed to exist and/or identified, and by which the actions of blocks 304 and 306 of FIG. 3 may be executed.

FIG. 7 shows an example method 700, including two alternative techniques (the examples of block 702 and blocks 704-708) by which a data-transfer process may be confirmed to exist and/or identified, and by which the actions of blocks 304 and 306 of FIG. 3 may be executed. Referring to FIG. 3, at block 304 it is determined which processes (i.e., executable software) are operating on the smart utility meter 108 when the command of block 302 arrives. This assessment of the operating processes helps to determine how to handle (e.g., accept, reject, delay, etc.) the command. Part of what block 304 does is to look for an active process that is doing the same and/or similar actions of the command 302. This is seen at block 306, where it is determined if a process is already at work transferring the first data file.

In the first example of how such a process may be identified, at block 702 information is compared, including: (1) the information of the command received at block 302; which is compared to (2) information on data transfers currently in operation in the computing device. Accordingly, it can be determined if the transfer of data indicated by the command of block 302 in FIG. 3 is already in progress. If so, the process may be resumed (e.g., at block 208 of FIG. 2).

In a more specific example seen at blocks 704-708, command parameters are considered and compared. At block 704, blocks 706, 708 are compared to determine if the process indicated by the command (e.g., block 302 of FIG. 3) is operating. The elements of block 706, including: values of parameters passed in Device Language Message Specification (DLMS)/Companion Specification for Energy Metering (COSEM) methods of execution; are compared to the elements of block 708, including: values of parameters in attributes of DLMS/COSEM object(s) that hold information on data-file transfers in the computing device. The comparison determines if a process the same or similar to the process ordered by the command of block 302 is already in progress. If so, the process may be resumed (e.g., at block 208 of FIG. 2).

Example Systems, Devices, and Methods

The following examples of data transfer with a resume command are expressed as numbered clauses. While the examples illustrate a number of possible configurations and techniques, they are not meant to be an exhaustive listing of the systems, methods, and/or techniques described herein.

1. One or more non-transitory computer-readable media storing computer-executable instructions that, when executed by one or more processors, configure a computing device to perform actions comprising: receiving a command to transfer a first data file; determining if at least two processes exist or do not exist from among processes comprising: a first data-transfer process of the first data file; a second data-transfer process of a second data file; and a third process, not related to the first data-transfer process or the second data-transfer process; and selecting an action from among a plurality of actions, wherein the selecting is based at least in part on which processes were found to exist, from among processes comprising: the first data-transfer process; the second data-transfer process, and the third process; wherein the plurality of actions comprises: resuming the first data-transfer process; canceling the second data-transfer process and starting a new data-transfer process to transfer the first data file; rejecting the command; allowing the third process to conclude and then starting the new data-transfer process to transfer the first data file; and starting the new data-transfer process to transfer the first data file.

2. The one or more non-transitory computer-readable media as recited in clause 1, the actions additionally comprising: checking the command for a cancel-if-necessary notation; and responsive to finding the cancel-if-necessary notation, cancelling the second data-transfer process and starting the new data-transfer process to transfer the first data file.

3. The one or more non-transitory computer-readable media as recited in clause 1, the actions additionally comprising: determining if the third process will conclude within a threshold period of time; and responsive to finding that the third process will conclude within the threshold period of time, allowing the third process to conclude and starting the new data-transfer process to transfer the first data file.

4. The one or more non-transitory computer-readable media as recited in clause 1, where: responsive to confirmed existence of the first data-transfer process, resuming the first data-transfer process; responsive to confirmed existence of the second data-transfer process and a cancel-if-necessary indicator in the command, canceling the second data-transfer process and starting the new data-transfer process to transfer the first data file; responsive to existence of the second data-transfer process or existence of the third process, wherein the third process will not conclude within a threshold period of time, rejecting the command; responsive to the third process ending within the threshold period of time, allowing the third process to conclude and starting the new data-transfer process to transfer the first data file; and responsive to the existence of none of: the first data-transfer process; the second data-transfer process; and the third process, starting the new data-transfer process to transfer the first data file.

5. The one or more non-transitory computer-readable media as recited in clause 1, wherein determining if the first data-transfer process exists comprises: comparing information included with the command to information on data transfers in operation in the computing device.

6. The one or more non-transitory computer-readable media as recited in clause 1, wherein determining if the first data-transfer process of the first data file exists comprises comparing values comprising: values of parameters passed in a Device Language Message Specification (DLMS)/Companion Specification for Energy Metering (COSEM) methods of execution; and values of parameters in attributes of DLMS/COSEM object(s) that hold information on data-file transfers in the computing device.

7. The one or more non-transitory computer-readable media as recited in clause 1, wherein the computer-executable instructions of the non-transitory computer-readable media are configured to operate the computing device within a Device Language Message Specification (DLMS)/Companion Specification for Energy Metering (COSEM) environment.

8. The one or more non-transitory computer-readable media as recited in clause 1, additionally comprising one or more or all of any of the preceding clauses.

9. A computing device, comprising: a processor; one or more memory devices in communication with the processor; statements, defined in the one or more memory devices, which when executed by the processor to perform actions comprising: receiving a command to transfer a first data file; determining if at least two processes exist or do not exist from among processes comprising: a first data-transfer process of the first data file; a second data-transfer process of a second data file; and a third process, not related to the first data-transfer process or the second data-transfer process; and selecting an action from among a plurality of actions, wherein the selecting is based at least in part on which processes were found to exist, from among processes comprising: the first data-transfer process; the second data-transfer process, and the third process; wherein the plurality of actions comprises: resuming the first data-transfer process; canceling the second data-transfer process and starting a new data-transfer process to transfer the first data file; rejecting the command; allowing the third process to conclude and then starting the new data-transfer process to transfer the first data file; and starting the new data-transfer process to transfer the first data file.

10. The computing device of clause 9, the actions additionally comprising: checking the command for a cancel-if-necessary notation; and responsive to finding the cancel-if-necessary notation, cancelling the second data-transfer process and starting the new data-transfer process to transfer the first data file.

11. The computing device of clause 9, the actions additionally comprising: determining if the third process will conclude within a threshold period of time; and responsive to finding that the third process will conclude within the threshold period of time, allowing the third process to conclude and starting the new data-transfer process to transfer the first data file.

12. The computing device of clause 9, wherein: responsive to confirmed existence of the first data-transfer process, resuming the first data-transfer process; responsive to confirmed existence of the second data-transfer process and a cancel-if-necessary indicator in the command, canceling the second data-transfer process and starting the new data-transfer process to transfer the first data file; responsive to existence of the second data-transfer process and the lack of a cancel-if-necessary indicator in the command or existence of the third process, wherein the third process will not conclude within a threshold period of time, rejecting the command; responsive to the third process ending within the threshold period of time, allowing the third process to conclude and starting the new data-transfer process to transfer the first data file; and responsive to the existence of none of: the first data-transfer process; the second data-transfer process; and the third process, starting the new data-transfer process to transfer the first data file.

13. The computing device of clause 9, wherein determining if the first data-transfer process exists comprises: comparing information included with the command to information on data transfers in operation in the computing device.

14. The computing device of clause 9, wherein determining if the first data-transfer process of the first data file exists comprises comparing values comprising: values of parameters passed in a Device Language Message Specification (DLMS)/Companion Specification for Energy Metering (COSEM) methods of execution; and values of parameters in attributes of DLMS/COSEM object(s) that hold information on data-file transfers in the computing device.

15. The computing device of clause 9, wherein the actions are configured to operate the computing device within a Device Language Message Specification (DLMS)/Companion Specification for Energy Metering (COSEM) environment.

16. The computing device of clause 9, additionally comprising one or more or all of any of the preceding clauses.

17. A method for operating a computing device, comprising: receiving a command to transfer a first data file; determining if at least two processes exist or do not exist from among processes comprising: a first data-transfer process of the first data file; a second data-transfer process of a second data file; and a third process, not related to the first data-transfer process or the second data-transfer process; and selecting an action from among a plurality of actions, wherein the selecting is based at least in part on which processes were found to exist, from among processes comprising: the first data-transfer process; the second data-transfer process, and the third process; wherein the plurality of actions comprises: resuming the first data-transfer process; canceling the second data-transfer process and starting a new data-transfer process to transfer the first data file; rejecting the command; allowing the third process to conclude and then starting the new data-transfer process to transfer the first data file; and starting the new data-transfer process to transfer the first data file.

18. The method as recited in clause 17, additionally comprising: checking the command for a cancel-if-necessary notation; and responsive to finding the cancel-if-necessary notation, cancelling the second data-transfer process and starting the new data-transfer process to transfer the first data file.

19. The method as recited in clause 17, additionally comprising: determining if the third process will conclude within a threshold period of time; and responsive to finding that the third process will conclude within the threshold period of time, allowing the third process to conclude and starting the new data-transfer process to transfer the first data file.

20. The method as recited in clause 17, wherein: responsive to confirmed existence of the first data-transfer process, resuming the first data-transfer process; responsive to confirmed existence of the second data-transfer process and a cancel-if-necessary indicator in the command, canceling the second data-transfer process and starting the new data-transfer process to transfer the first data file; responsive to existence of the second data-transfer process and the lack of a cancel-if-necessary indicator in the command or existence of the third process, wherein the third process will not conclude within a threshold period of time, rejecting the command; responsive to the third process ending within the threshold period of time, allowing the third process to conclude, and starting the new data-transfer process to transfer the first data file; and responsive to the existence of none of: the first data-transfer process; the second data-transfer process; and the third process, starting the new data-transfer process to transfer the first data file.

21. The method as recited in clause 17, wherein determining if the first data-transfer process exists comprises: comparing information included with the command to information on data transfers in operation in the computing device.

22. The method as recited in clause 17, wherein determining if the first data-transfer process of the first data file exists comprises comparing values comprising: values of parameters passed in a Device Language Message Specification (DLMS)/Companion Specification for Energy Metering (COSEM) methods of execution; and values of parameters in attributes of DLMS/COSEM object(s) that hold information on data-file transfers in the computing device.

23. The method as recited in clause 17, additionally comprising one or more or all of any of the preceding clauses.

CONCLUSION

Although the subject matter has been described in language specific to structural features and/or methodological actions, it is to be understood that the subject matter defined in the appended claims is not necessarily limited to the specific features or actions described. Rather, the specific features and actions are disclosed as exemplary forms of implementing the claims.

The words comprise, comprises, and/or comprising, when used in this specification and/or claims do not preclude the presence or addition of one or more other features, devices, techniques, and/or components and/or groups thereof.

The invention claimed is:

1. One or more non-transitory computer-readable media storing computer-executable instructions that, when executed by one or more processors, configure a computing device to perform actions comprising:

receiving a command to transfer a first data file;

determining if at least two processes exist or do not exist from among processes comprising:

a first data-transfer process of the first data file;

a second data-transfer process of a second data file; and a third process, not related to the first data-transfer process or the second data-transfer process; and selecting an action from among a plurality of actions, wherein the selecting is based at least in part on which processes were found to exist, from among processes comprising: the first data-transfer process, the second data-transfer process, and the third process;

wherein the plurality of actions comprises:

resuming the first data-transfer process;

canceling the second data-transfer process and starting a new data-transfer process to transfer the first data file;

rejecting the command;

allowing the third process to conclude and then starting the new data-transfer process to transfer the first data file; and starting the new data-transfer process to transfer the first data file.

2. The one or more non-transitory computer-readable media as recited in claim 1, the actions additionally comprising:

checking the command for a cancel-if-necessary notation; and responsive to finding the cancel-if-necessary notation, cancelling the second data-transfer process and starting the new data-transfer process to transfer the first data file.

3. The one or more non-transitory computer-readable media as recited in claim 1, the actions additionally comprising:

determining if the third process will conclude within a threshold period of time; and responsive to finding that the third process will conclude within the threshold period of time, allowing the third process to conclude and starting the new data-transfer process to transfer the first data file.

4. The one or more non-transitory computer-readable media as recited in claim 1, where:

responsive to confirmed existence of the first data-transfer process, resuming the first data-transfer process;

responsive to confirmed existence of the second data-transfer process and a cancel-if-necessary indicator in the command, canceling the second data-transfer process and starting the new data-transfer process to transfer the first data file;

responsive to existence of the second data-transfer process or existence of the third process, wherein the third process will not conclude within a threshold period of time, rejecting the command;

responsive to the third process ending within the threshold period of time, allowing the third process to conclude and starting the new data-transfer process to transfer the first data file; and responsive to the existence of none of: the first data-transfer process; the second data-transfer process; and the third process, starting the new data-transfer process to transfer the first data file.

5. The one or more non-transitory computer-readable media as recited in claim 1, wherein determining if the first data-transfer process exists comprises:

comparing information included with the command to information on data transfers in operation in the computing device.

6. The one or more non-transitory computer-readable media as recited in claim 1, wherein determining if the first data-transfer process of the first data file exists comprises comparing values comprising:

values of parameters passed in a Device Language Message Specification (DLMS)/Companion Specification for Energy Metering (COSEM) methods of execution; and values of parameters in attributes of DLMS/COSEM object(s) that hold information on data-file transfers in the computing device.

7. The one or more non-transitory computer-readable media as recited in claim 1, wherein the computer-executable instructions of the non-transitory computer-readable media are configured to operate the computing device within a Device Language Message Specification (DLMS)/Companion Specification for Energy Metering (COSEM) environment.

8. A computing device, comprising:

a processor;

one or more memory devices in communication with the processor;

statements, defined in the one or more memory devices, which when executed by the processor to perform actions comprising:

receiving a command to transfer a first data file;

determining if at least two processes exist or do not exist from among processes comprising:

a first data-transfer process of the first data file;

a second data-transfer process of a second data file; and a third process, not related to the first data-transfer process or the second data-transfer process; and selecting an action from among a plurality of actions, wherein the selecting is based at least in part on which processes were found to exist, from among processes comprising: the first data-transfer process, the second data-transfer process, and the third process;

wherein the plurality of actions comprises:

resuming the first data-transfer process;

canceling the second data-transfer process and starting a new data-transfer process to transfer the first data file;

rejecting the command;

allowing the third process to conclude and then starting the new data-transfer process to transfer the first data file; and starting the new data-transfer process to transfer the first data file.

9. The computing device of claim 8, the actions additionally comprising:

checking the command for a cancel-if-necessary notation; and responsive to finding the cancel-if-necessary notation, cancelling the second data-transfer process and starting the new data-transfer process to transfer the first data file.

10. The computing device of claim 8, the actions additionally comprising:

determining if the third process will conclude within a threshold period of time; and responsive to finding that the third process will conclude within the threshold period of time, allowing the third process to conclude and starting the new data-transfer process to transfer the first data file.

11. The computing device of claim 8, wherein:

responsive to confirmed existence of the first data-transfer process, resuming the first data-transfer process;

responsive to confirmed existence of the second data-transfer process and a cancel-if-necessary indicator in the command, canceling the second data-transfer process and starting the new data-transfer process to transfer the first data file;

responsive to existence of the second data-transfer process and the lack of a cancel-if-necessary indicator in the command or existence of the third process, wherein the third process will not conclude within a threshold period of time, rejecting the command;

responsive to the third process ending within the threshold period of time, allowing the third process to conclude and starting the new data-transfer process to transfer the first data file; and responsive to the existence of none of: the first data-transfer process; the second data-transfer process; and the third process, starting the new data-transfer process to transfer the first data file.

12. The computing device of claim 8, wherein determining if the first data-transfer process exists comprises:

comparing information included with the command to information on data transfers in operation in the computing device.

13. The computing device of claim 8, wherein determining if the first data-transfer process of the first data file exists comprises comparing values comprising:

values of parameters passed in a Device Language Message Specification (DLMS)/Companion Specification for Energy Metering (COSEM) methods of execution; and values of parameters in attributes of DLMS/COSEM object(s) that hold information on data-file transfers in the computing device.

14. The computing device of claim 8, wherein the actions are configured to operate the computing device within a Device Language Message Specification (DLMS)/Companion Specification for Energy Metering (COSEM) environment.

15. A method for operating a computing device, comprising:
receiving a command to transfer a first data file;
determining if at least two processes exist or do not exist from among processes comprising:
a first data-transfer process of the first data file;
a second data-transfer process of a second data file; and
a third process, not related to the first data-transfer process or the second data-transfer process; and
selecting an action from among a plurality of actions, wherein the selecting is based at least in part on which processes were found to exist, from among processes comprising: the first data-transfer process, the second data-transfer process, and the third process;
wherein the plurality of actions comprises:
resuming the first data-transfer process;
canceling the second data-transfer process and starting a new data-transfer process to transfer the first data file;
rejecting the command;
allowing the third process to conclude and then starting the new data-transfer process to transfer the first data file; and
starting the new data-transfer process to transfer the first data file.

16. The method as recited in claim 15, additionally comprising:
checking the command for a cancel-if-necessary notation; and
responsive to finding the cancel-if-necessary notation, cancelling the second data-transfer process and starting the new data-transfer process to transfer the first data file.

17. The method as recited in claim 15, additionally comprising:
determining if the third process will conclude within a threshold period of time; and
responsive to finding that the third process will conclude within the threshold period of time, allowing the third process to conclude and starting the new data-transfer process to transfer the first data file.

18. The method as recited in claim 15, wherein:
responsive to confirmed existence of the first data-transfer process, resuming the first data-transfer process;
responsive to confirmed existence of the second data-transfer process and a cancel-if-necessary indicator in the command, canceling the second data-transfer process and starting the new data-transfer process to transfer the first data file;
responsive to existence of the second data-transfer process and the lack of a cancel-if-necessary indicator in the command or existence of the third process, wherein the third process will not conclude within a threshold period of time, rejecting the command;
responsive to the third process ending within the threshold period of time, allowing the third process to conclude, and starting the new data-transfer process to transfer the first data file; and
responsive to the existence of none of: the first data-transfer process; the second data-transfer process; and the third process, starting the new data-transfer process to transfer the first data file.

19. The method as recited in claim 15, wherein determining if the first data-transfer process exists comprises:
comparing information included with the command to information on data transfers in operation in the computing device.

20. The method as recited in claim 15, wherein determining if the first data-transfer process of the first data file exists comprises comparing values comprising:
values of parameters passed in a Device Language Message Specification (DLMS)/Companion Specification for Energy Metering (COSEM) methods of execution; and
values of parameters in attributes of DLMS/COSEM object(s) that hold information on data-file transfers in the computing device.

* * * * *